(12) United States Patent
Ishizue

(10) Patent No.: US 9,001,218 B2
(45) Date of Patent: Apr. 7, 2015

(54) CAMERA MODULE AND IMAGE CAPTURING DEVICE HAVING DECREASED DISTORTION IN THE VICINITY OF THE MAXIMUM IMAGE HEIGHT

(75) Inventor: Yoshihito Ishizue, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 105 days.

(21) Appl. No.: 13/825,458

(22) PCT Filed: Sep. 21, 2011

(86) PCT No.: PCT/JP2011/071425
§ 371 (c)(1),
(2), (4) Date: Mar. 21, 2013

(87) PCT Pub. No.: WO2012/039408
PCT Pub. Date: Mar. 29, 2012

(65) Prior Publication Data
US 2013/0182136 A1 Jul. 18, 2013

(30) Foreign Application Priority Data
Sep. 24, 2010 (JP) .................................. 2010-214515

(51) Int. Cl.
| H04N 5/228 | (2006.01) |
| H04N 5/232 | (2006.01) |
| G02B 13/00 | (2006.01) |
| G03B 3/02 | (2006.01) |
| H04N 5/225 | (2006.01) |
| G03B 5/02 | (2006.01) |

(52) U.S. Cl.
CPC ........ *H04N 5/23287* (2013.01); *G02B 13/0035* (2013.01); *G03B 3/02* (2013.01); *H04N 5/2257* (2013.01); *G03B 5/02* (2013.01); *G03B 2205/0015* (2013.01); *G03B 2205/0038* (2013.01)

(58) Field of Classification Search
USPC ...................................................... 348/208.11
See application file for complete search history.

(56) References Cited

U.S. PATENT DOCUMENTS

| 6,031,998 A * | 2/2000 | Shono ............................. 396/75 |
| 7,412,162 B2 * | 8/2008 | Nomura ......................... 396/268 |
| 2003/0067544 A1* | 4/2003 | Wada ........................ 348/208.7 |
| 2006/0056829 A1* | 3/2006 | Hirota et al. .................... 396/54 |
| 2006/0115260 A1* | 6/2006 | Nomura ........................ 396/268 |
| 2006/0250504 A1* | 11/2006 | Seo ........................... 348/208.11 |

(Continued)

FOREIGN PATENT DOCUMENTS

| JP | 2006-129175 | 5/2006 |
| JP | 2007-33879 | 2/2007 |

(Continued)

OTHER PUBLICATIONS

International Search Report mailed Nov. 8, 2011, in corresponding PCT Application No. PCT/JP2011/071425.

*Primary Examiner* — Usman Khan
(74) *Attorney, Agent, or Firm* — Keating & Bennett, LLP

(57) ABSTRACT

A camera module (100) of the present invention includes: an optical section (1) including a lens section (11); and an OIS section (3) correcting misalignment of an optical axis. The lens section (11) has an image height-optical distortion curve in which an optical distortion is a positive maximum value in an intermediate image height region and the optical distortion gradually decreases from the maximum value as an image height approaches a maximum image height.

6 Claims, 12 Drawing Sheets

(56) References Cited

U.S. PATENT DOCUMENTS

| | | |
|---|---|---|
| 2007/0008415 A1* | 1/2007 | Higo .................... 348/208.11 |
| 2007/0031134 A1* | 2/2007 | Kuroda et al. ................ 396/55 |
| 2008/0158688 A1 | 7/2008 | Ohtake et al. |
| 2008/0165271 A1* | 7/2008 | Nakazawa et al. ............ 348/340 |
| 2008/0304167 A1 | 12/2008 | Souma |
| 2010/0322607 A1 | 12/2010 | Kuroda et al. |
| 2011/0109974 A1 | 5/2011 | Sato |

FOREIGN PATENT DOCUMENTS

| | | |
|---|---|---|
| JP | 2008-164724 | 7/2008 |
| JP | 2008-304706 | 12/2008 |
| JP | 2011-102865 | 5/2011 |

* cited by examiner

F I G. 1 1
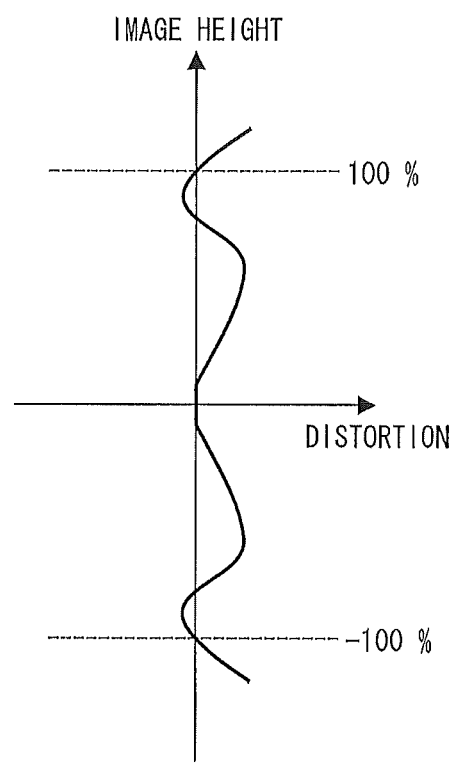

CAMERA MODULE AND IMAGE CAPTURING DEVICE HAVING DECREASED DISTORTION IN THE VICINITY OF THE MAXIMUM IMAGE HEIGHT

TECHNICAL FIELD

The present invention relates to a camera module, more specifically, a camera module including an optical image stabilizer of a lens-shift system or a sensor-shift system.

BACKGROUND ART

Conventionally, an imaging device, such as a digital video camera and a digital still camera, that includes an optical image stabilizer (hereinafter, referred to as OIS) has been in practical use. The OIS is a mechanism for correcting burring that occurs in a captured image due to camera shake.

The OIS includes a gyro sensor that detects, in terms of an angular velocity, etc., an inclination of an imaging device which inclination is caused by camera shake. Then, the OIS corrects misalignment of an optical axis with respect to a light-receiving section of an image sensor, by shifting, in accordance with an output signal from the gyro sensor, a lens or an image sensor such as a CCD in a vertical direction with respect to the optical axis, that is, in parallel to the light-receiving section of the image sensor. This can make an object image static relative to the image sensor. As a result, blurring that occurs in a captured image due to camera shake can be corrected. This consequently makes it possible to prevent an image from blurring.

(a) of FIG. 9 is a side view illustrating an operation in image stabilization performed by a conventional camera module 200. (b) of FIG. 9 is a schematic view illustrating a captured image that is taken by the conventional camera module 200 as illustrated in (a) of FIG. 9.

As illustrated in (a) of FIG. 9, when the camera module 200 is inclined with respect to an object O due to camera shake, the camera module 200 shifts an image sensor section 105 in a negative X direction so that a center Oc of the object O is on an optical axis s. This causes a center OIc of an object image OI in a captured image to coincide with a center Ic of the captured image, as illustrated in (b) of FIG. 9. Thereby, blurring caused in the captured image by camera shake is corrected.

However, as illustrated in (b) of FIG. 9, when an image is captured under image stabilization by the conventional camera module 200, distortion or the like occurs in thus captured image because perspective (scale factor) alters in a peripheral portion of the object image OI.

FIG. 10 is a graph showing a relation between an image height and an optical distortion in a case where the camera module 200 is inclined with respect to the object O illustrated in (a) of FIG. 9. In FIG. 10, a vertical axis represents an image height (%), while a horizontal axis represents an optical distortion (%). Here, the image height indicates a distance from a center position of a captured image. In a case where the camera module 200 inclines with respect to the object O, an influence of the optical distortion on a captured image becomes more significant as the image height increases (see FIG. 10). In a case where the optical distortion is positive at a given image height, an object image captured at the given image height appears larger. Meanwhile, in a case where the optical distortion is negative at another given image height, the object image captured at this image height appears smaller. Note that the optical distortion is a ratio (value) that is obtained by dividing a difference between an ideal image height and a real image height by the ideal image height. A difference in optical distortion between maximum image heights (±100%) is a camera-movement amount. At a larger camera-movement amount, a peripheral portion of a captured image is more significantly distorted.

FIG. 11 is a graph illustrating a general image height-optical distortion curve for a lens section of the conventional camera module 200 illustrated in (a) of FIG. 9.

As illustrated in FIG. 11, in general, the lens section of the conventional camera module 200 has an image height-optical distortion curve that has characteristics such that: an optical distortion is 0 in a minimum image height (0%) region; the optical distortion is a positive maximum value in each of intermediate image height (±50%) regions; decreasing from this positive maximum value, the optical distortion becomes a negative minimum value in each of image height (±90%) regions each of which has an absolute image height percentage value that is a little lower than an absolute percentage value of each of the maximum image heights (±100%); and increasing from this minimum value, the optical distortion passes through 0 at each of the maximum image heights (±100%). In other words, the lens section of the conventional camera module 200 has an optical distortion characteristic such that the optical distortion is increasing at the maximum image heights (±100%) and in the vicinity of the maximum image heights.

FIG. 12 is a graph showing an image height-optical distortion curve of the conventional lens section in the image stabilization as illustrated in (a) of FIG. 9. As shown in FIG. 12, in the image height-optical distortion curve of the lens section in the image stabilization, an amount of change produced by a shift of the image sensor section 105 is added to an amount of change in optical distortion produced by an inclination of the camera module 200 with respect to the object O. Here, the lens section has the image height-optical distortion curve as shown in FIG. 11, that is, an optical distortion curve in which the optical distortion is increasing at the maximum image heights (±100%) and in the vicinity of the maximum image heights. In such an optical lens, the amount of change in optical distortion produced by an inclination of the camera module 200 with respect to the object O has the same polarity as the amount of change in optical distortion produced by a shift of the image sensor section 105. This increases a camera-movement amount in the image stabilization. Accordingly, the conventional camera module 200 had a problem in that a significant change occurs in perspective in a peripheral portion of an captured image OI as illustrated in (b) of FIG. 9 and such a significant change causes distortion in a captured image.

In order to solve the above problem, Patent Literature 1 proposes a technique for suppressing distortion in a captured image by digital correction with use of an ISP (Image Signal Processor). According to Patent Literature 1, the distortion in a captured image is suppressed by (i) finding out a zoom position and the like, (ii) adaptively changing a process parameter, and (iii) correcting the captured image that is stored in a memory.

CITATION LIST

Patent Literatures

[Patent Literature 1]
Japanese Patent Application Publication, Tokukai, No. 2006-129175 (Publication Date: May 18, 2006)

SUMMARY OF INVENTION

Technical Problem

However, the technique disclosed in Patent Literature 1 requires a high-performance ISP (Image Signal Processor) for the purpose of carrying out the digital correction. Particularly, in case of capturing a moving image, camera shake occurs all the time. Therefore, in such a case, it is required (i) to mount a large-capacity buffer memory for carrying out high-speed correction, (ii) to additionally provide a battery in accordance with an increase in power consumption that is used for driving a circuit all the time, and the like.

On this account, the technique disclosed in Patent Literature 1 increases production cost due to complication of a device configuration, and this is against miniaturization of today's imaging device.

The present invention is attained in view of the above conventional problem. An object of the present invention is to provide, at low cost, a compact camera module that is capable of suppressing distortion in a captured image in image stabilization.

Solution to Problem

In order to solve the above problem, a camera module of the present invention includes: optical means including a lens section made of at least one optical lens; sensor means including an image pickup element converting, into an electrical signal, light that enters the image pickup element through the lens section; and image stabilization means correcting misalignment of an optical axis with respect to the image pickup element, by shifting relative positions of the optical means and the sensor means in parallel to an image pickup plane of the image pickup element in accordance with an inclination of a main body of the camera module, the lens section having an image height-optical distortion curve in which an optical distortion is a positive maximum value in an intermediate image height region and the optical distortion gradually decreases from the maximum value as an image height approaches a maximum image height.

In general, in an image height-optical distortion curve of a lens section in image stabilization, an amount of change in optical distortion produced by shifting relative positions of the optical means and the sensor means with use of the image stabilization means is added to an amount of change in optical distortion produced by an inclination of the camera module with respect to the object. In case of a conventional camera module, this increases a camera-movement amount in image stabilization and as a result, significantly alters perspective (scale factor) in a peripheral section of an object image. This conventionally caused a problem of distortion in a captured image, for example.

In the above configuration, the lens section has an image height-optical distortion curve in which an optical distortion is a positive maximum value in an intermediate image height region and the optical distortion gradually decreases from the maximum value as an image height approaches the maximum image height. As a result, in image stabilization, a polarity of an amount of change in optical distortion produced by an inclination of the camera module with respect to the object is opposite to a polarity of an amount of change in optical distortion produced by shifting relative positions of the optical means and the sensor means with use of the image stabilization means. Therefore, these amounts of change in optical distortion cancel each other.

This makes it possible to reduce the camera-movement amount in image stabilization, as compared to that in case of a conventional camera module, and consequently suppress distortion in a captured image. Note that the above reduction in image distortion encompasses not only a continuous reduction but also a stepwise reduction.

As described above, in the above configuration, distortion in a captured image can be suppressed in image stabilization by optimizing the image height-optical distortion curve of the lens section. This makes it possible to provide, at low cost, a compact camera module which is capable of suppressing distortion in a captured image in image stabilization.

Further, in order to solve the above problem, an imaging device of the present invention includes the camera module.

This makes it possible to provide, at low cost, a compact imaging device that is capable of suppressing distortion in a captured image in image stabilization.

Advantageous Effects of Invention

As described above, a camera module of the present invention includes: optical means including a lens section made of at least one optical lens; sensor means including an image pickup element converting, into an electrical signal, light that enters the image pickup element through the lens section; and image stabilization means correcting misalignment of an optical axis with respect to the image pickup element, by shifting relative positions of the optical means and the sensor means in parallel to an image pickup plane of the image pickup element in accordance with an inclination of a main body of the camera module, the lens section having an image height-optical distortion curve in which an optical distortion is a positive maximum value in an intermediate image height region and the optical distortion gradually decreases from the maximum value as an image height approaches a maximum image height.

This makes it possible to suppress distortion in a captured image in image stabilization by optimizing an image height-optical distortion curve of the lens section in a configuration which does not include a special ISP (Image Signal Processor) that is conventionally provided.

Therefore, the present invention makes it possible to provide, at low cost, a compact camera module that is capable of suppressing distortion in a captured image in image stabilization.

Figure 5:
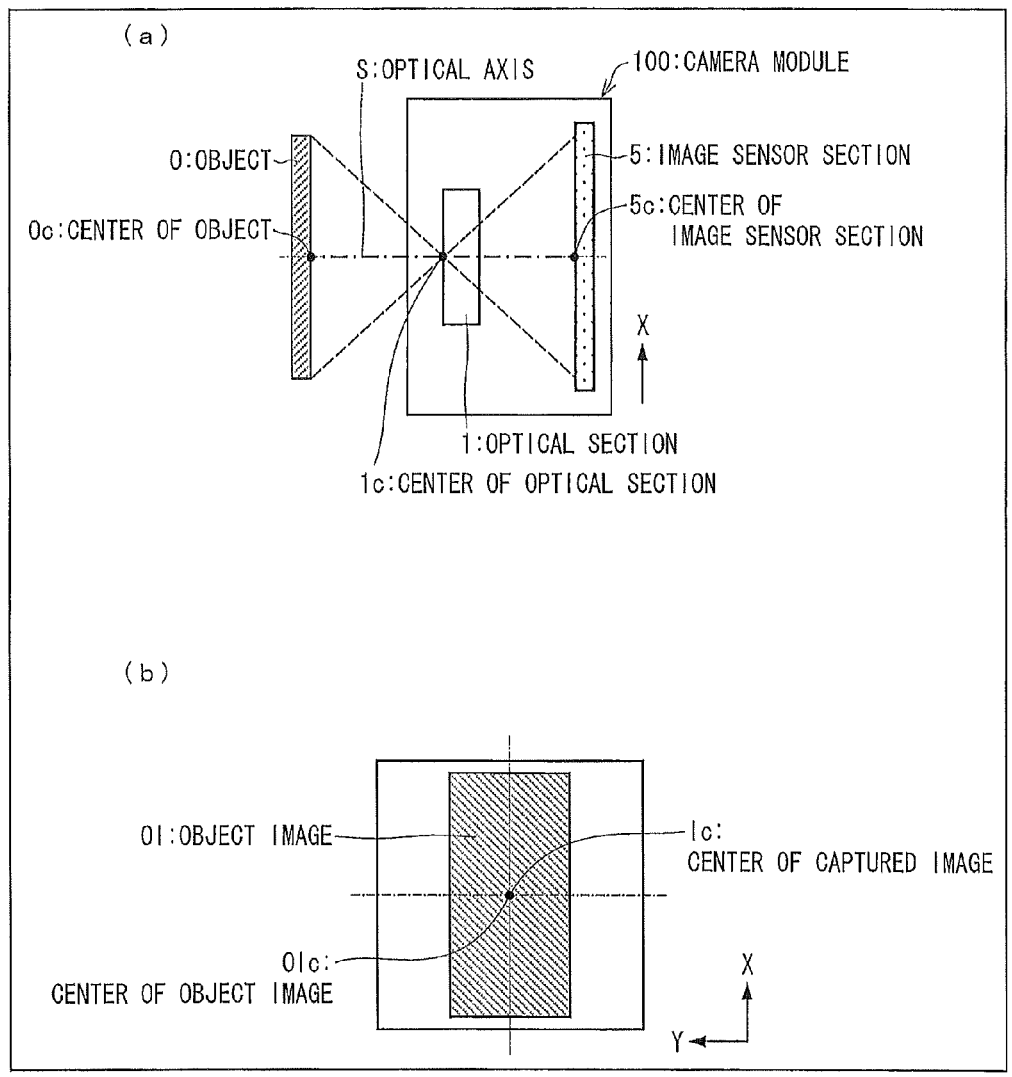
FIG. 5

(a) of FIG. 5 is a side view illustrating a state in which a camera module is directly confronting an object; and (b) of FIG. 5 is a schematic view illustrating a captured image taken by the camera module as illustrated in (a) of FIG. 5.

FIG. 6

Figure 6:
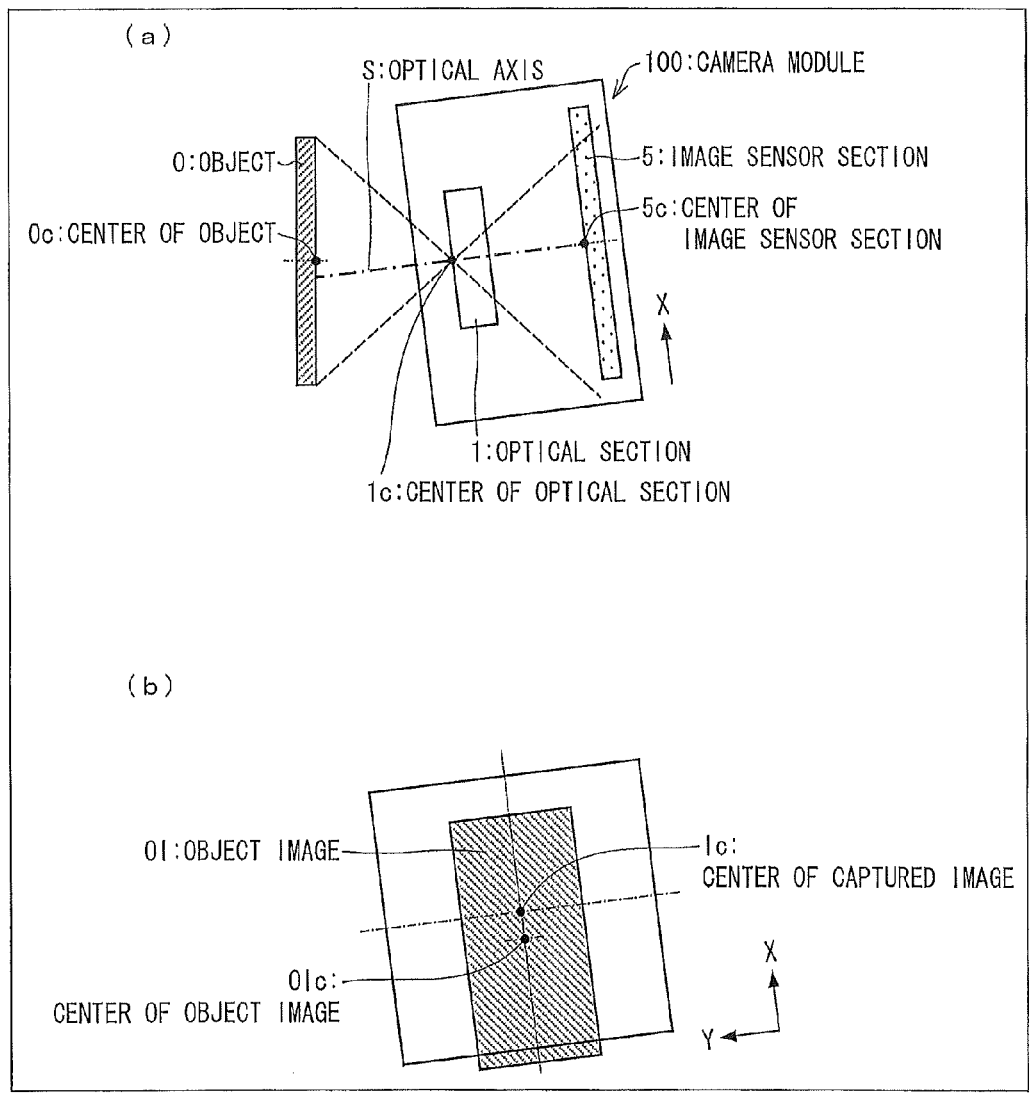

(a) of FIG. 6 is a side view illustrating a state in which a camera module is inclined with respect to an object; and (b) of FIG. 6 is a schematic view illustrating a captured image taken by the camera module as illustrated in (a) of FIG. 6.

FIG. 7

Figure 7:
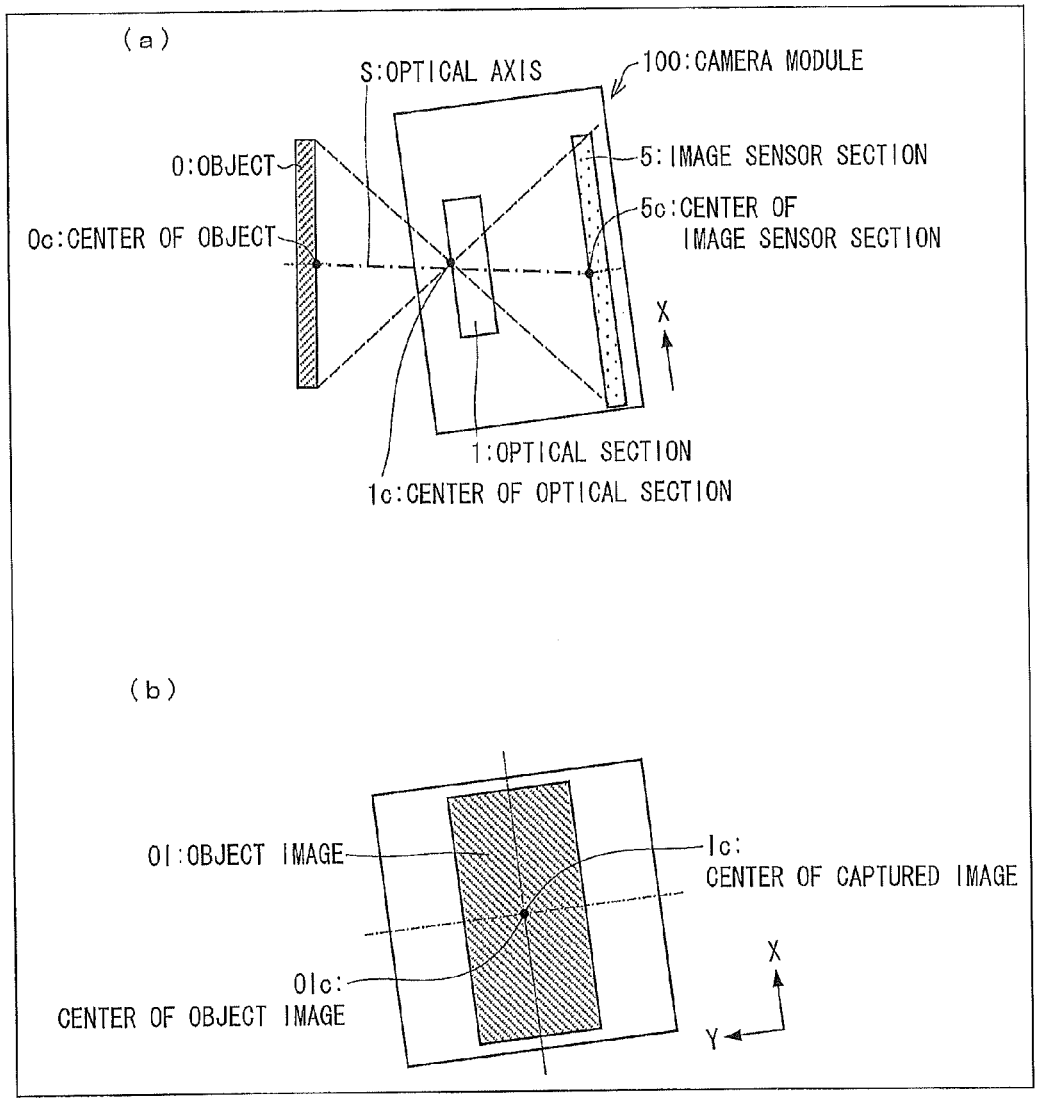

(a) of FIG. 7 is a side view illustrating an operation in image stabilization that is carried out by a camera module; and (b) of FIG. 7 is a schematic view illustrating a captured image taken by the camera module as illustrated in (a) of FIG. 7.

Figure 8:
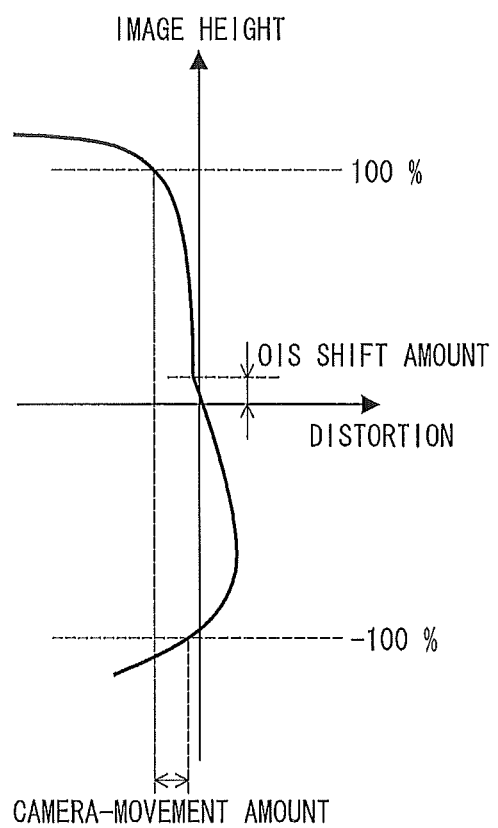

FIG. 8 is a graph showing an image height-optical distortion curve of a lens section in the image stabilization as illustrated in (a) of FIG. 7.

FIG. 9

Figure 9:
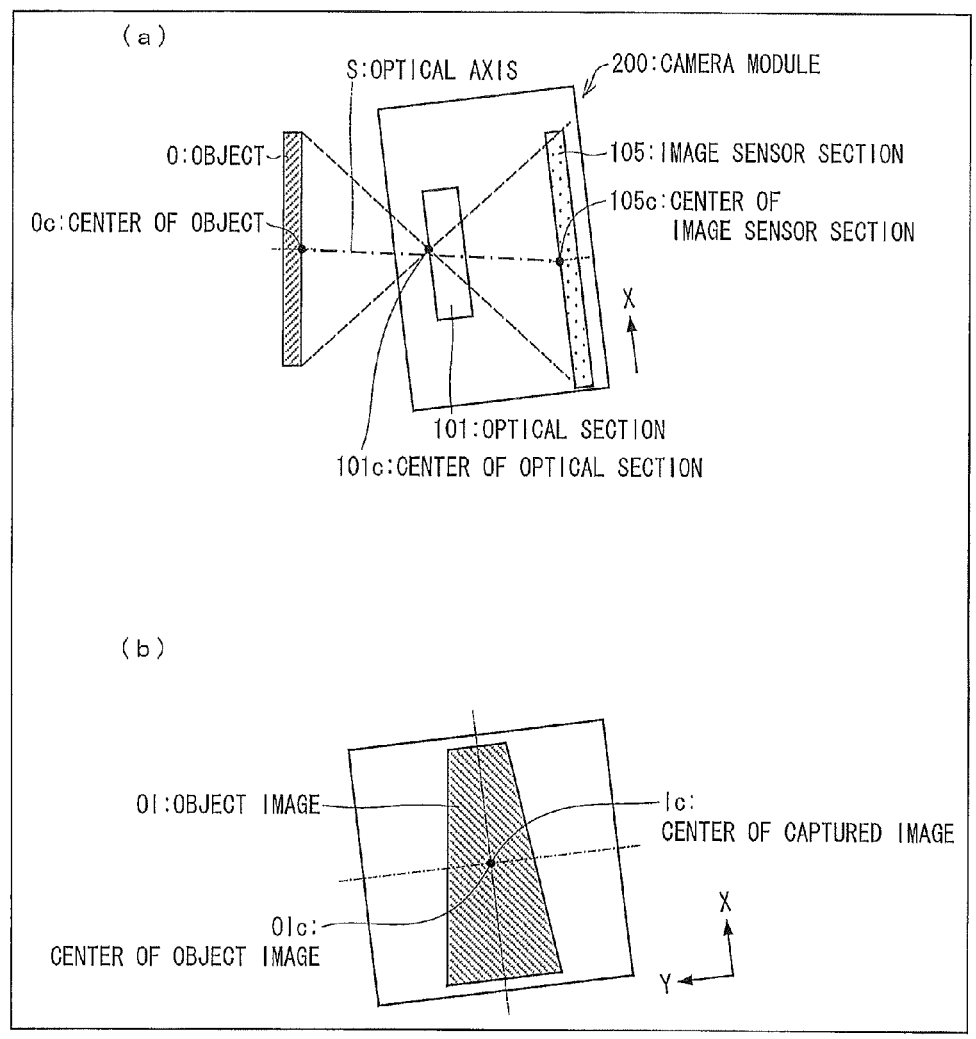

(a) of FIG. 9 is a side view illustrating an operation in image stabilization that is carried out by a conventional camera module; and (b) of FIG. 9 is a schematic view illustrating a captured image taken by the camera module as illustrated in (a) of FIG. 9.

Figure 10:
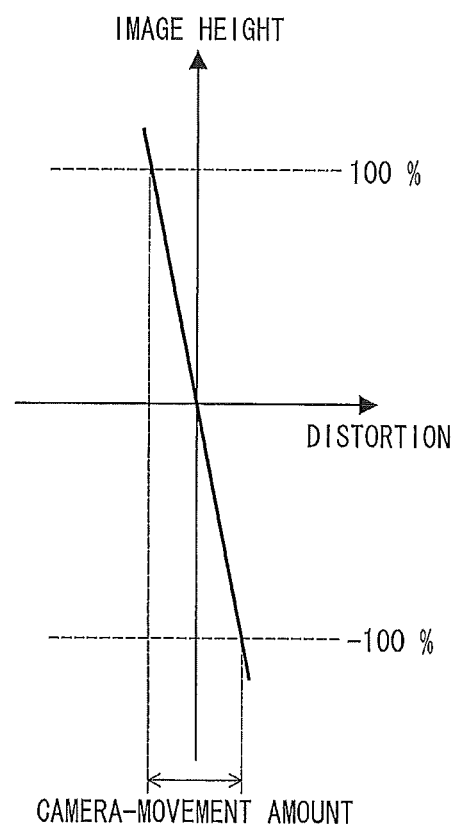

FIG. 10 is a graph showing a relation between an image height and an optical distortion in a case where the conventional camera module is inclined with respect to the object as illustrated in (a) of FIG. 9.

FIG. 11 is a graph showing a general image height-optical distortion curve of a lens section of the conventional camera module as illustrated in (a) of FIG. 9.

Figure 12:
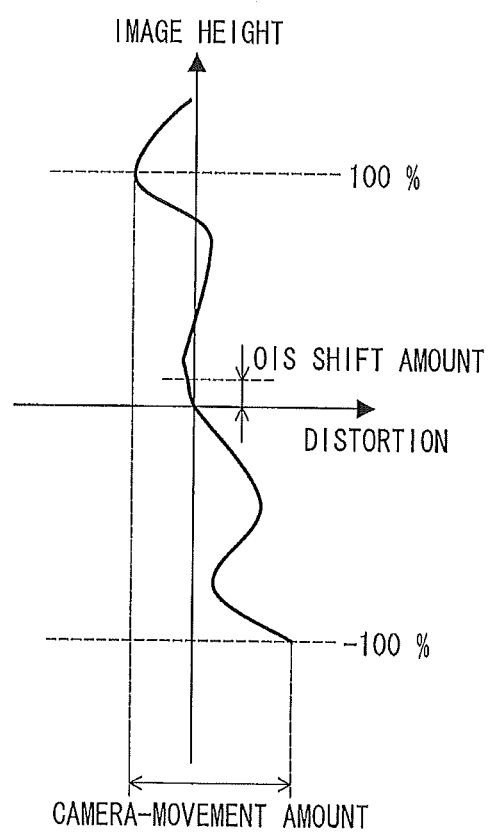

FIG. 12 is a graph showing an image height-optical distortion curve of the conventional lens section in the image stabilization as illustrated in (a) of FIG. 9.

DESCRIPTION OF EMBODIMENTS

Figure 1:
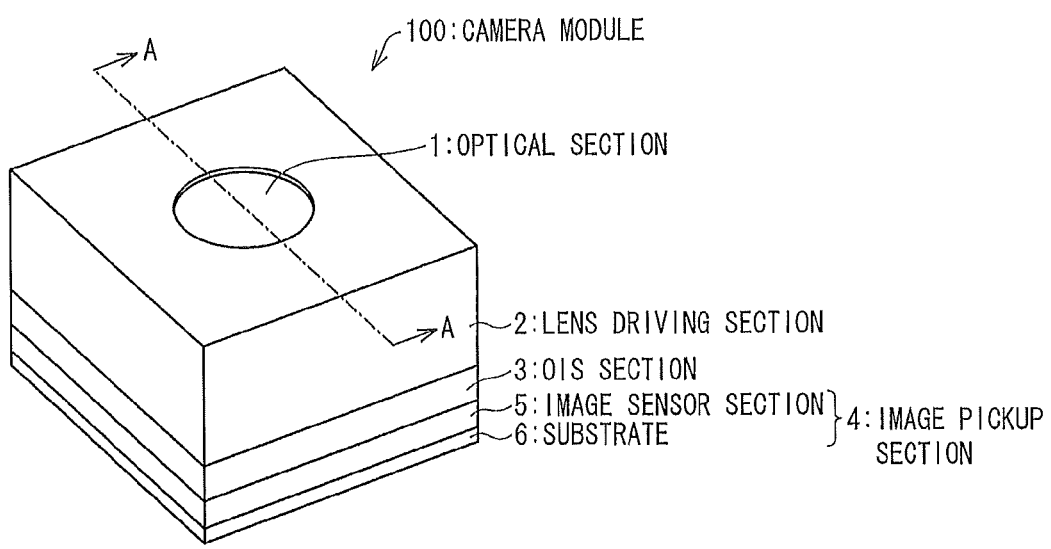
FIG. 1 is a perspective view illustrating an appearance configuration of a camera module of the present invention.

The following discusses one embodiment of a camera module of the present invention, with reference to FIGS. 1 thorough 8. The present embodiment discusses a camera module that includes an optical image stabilizer (OIS) of a sensor-shift system. In the following explanation, the present embodiment is given various limitations that are technically preferable for carrying out the present invention. However, the scope of the present invention is by no means limited to the following embodiments and attached drawings.

[1] CONFIGURATION OF CAMERA MODULE

Figure 2:
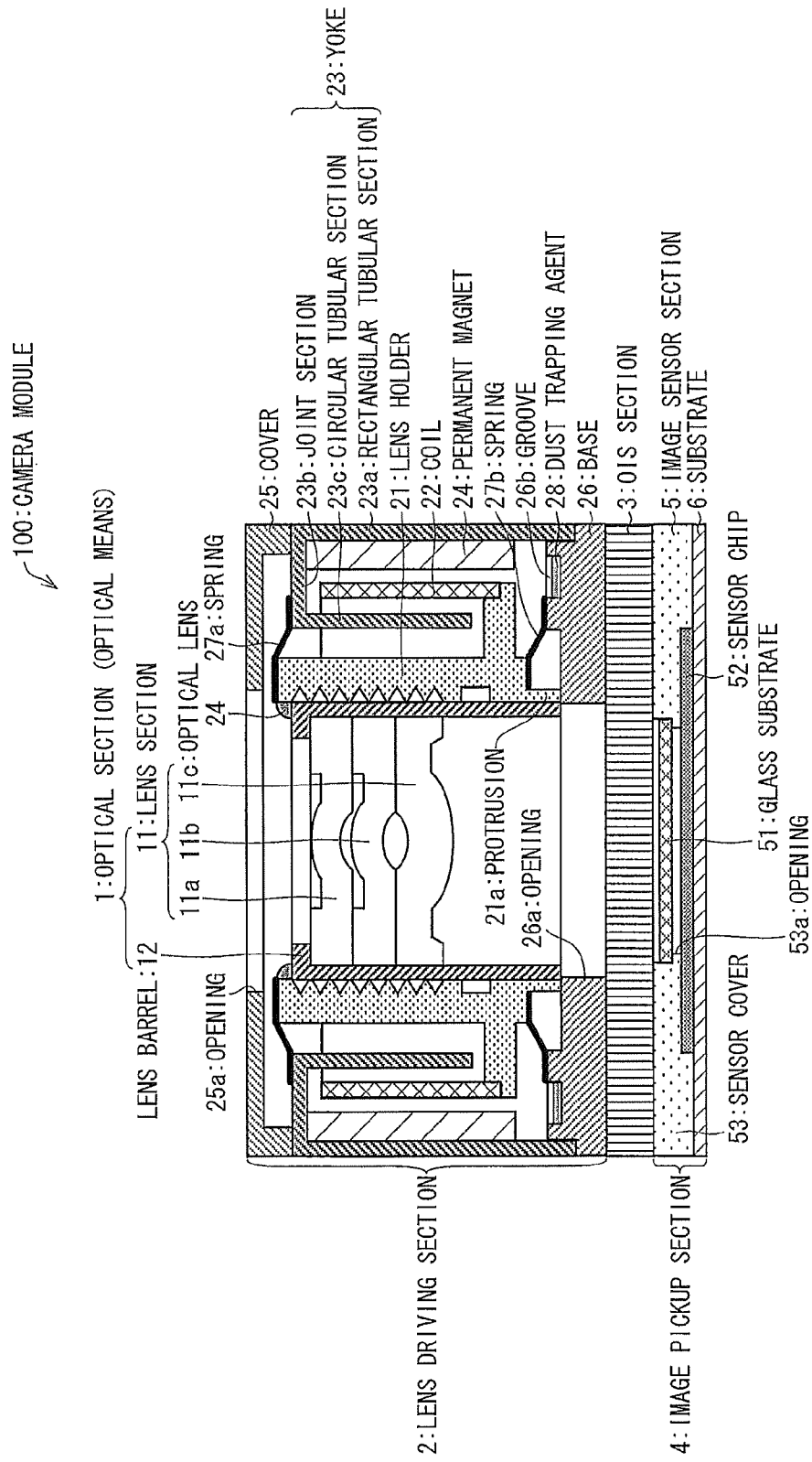
FIG. 2 is a cross sectional view taken along line A-A of the camera module illustrated in FIG. 1, and illustrates a state in which the camera module is cut at a center section along an optical axis.

First, the following explains a configuration of a camera module of the present embodiment, with reference to FIGS. 1 and 2.

FIG. 1 is a perspective view illustrating an appearance configuration of a camera module 100 of the present embodiment. As illustrated in FIG. 1, the camera module 100 includes an optical section (optical means) 1 that is an optical imaging system, a lens driving section 2 that drives the optical section 1, an OIS section (image stabilization means) 3 that carries out image stabilization, and an image pickup section 4 that carries out photoelectric conversion of light that enters through the optical section 1.

The optical section 1 is held in the lens driving section 2. Further, the image pickup section 4 includes an image sensor section (sensor means) 5 and a substrate 6 to which the image sensor section 5 is mounted. In other words, the camera module 100 is configured by stacking, on the substrate 6, the image sensor section 5, the OIS section 3, and the lens driving section 2 in this order in a direction in which the optical axis extends. Hereinafter, for convenience of explanation, an optical section 1 side is referred to as an upper side while an image pickup section 4 side is referred to as a lower side.

FIG. 2 is a cross sectional view taken along line A-A of the camera module 100 illustrated in FIG. 1, and illustrates a state in which the camera module 100 is cut at a center section along the optical axis.

The optical section 1 is an optical imaging system that forms an object image. The optical section 1 collects light from an object which light externally enters the optical section 1. Then, the optical section 1 leads thus collected light to the image sensor section 5 of the image pickup section 4. As illustrated in FIG. 2, the optical section 1 includes a lens section 11 and a lens barrel 12 that holds the lens section 11 by a side surface of the lens section 11.

The lens section 11 collects light from an object so as to form an image onto a light-receiving section of a sensor chip 52 that is provided in the image sensor section 5. In the present embodiment, the lens section 11 includes three optical lenses 11a to 11c. The lens section 11 may be made of a single optical lens. However, the configuration including such a plurality of optical lenses 11a to 11c as in the present embodiment makes it possible to form an image in various ways.

Further in the present embodiment, an image height-optical distortion (distortion aberration) curve of the lens section 11 is optimized for suppressing distortion in a captured image in image stabilization described later. Note that the image height-optical distortion curve of the lens section 11 will be described in detail later.

The lens barrel 12 is a circular tubular member. The lens barrel 12 holds, on an inner peripheral surface of the lens barrel 12, the lens section 11 so that an optical axis of the lens section 11 coincides with an axial center of the lens barrel 12. Further, while the lens barrel 12 has a screw section formed on an outer peripheral surface of the lens barrel 12, a lens holder 21 provided in the lens driving section 2 has another screw section formed on an inner peripheral surface of the lens holder 21. These screw sections are screwed together so that the lens barrel 12 is held by the lens holder 21.

The lens driving section 2 is an autofocus mechanism that adjusts a focus of the lens section 11 by moving the optical section 1 along the optical axis. That is, the lens driving section 2 moves the lens section 11 up and down between an infinity end and a macro end so as to adjust a focus of the lens section 11. Note that in the present embodiment, the lens driving section 2 is configured by using an autofocus mechanism of a VCM type. However, the lens driving section 2 may alternatively be configured by using, for example, a piezoactuator or a stepping motor.

Further, the lens driving section 2 has a movable section and a fixed section. When the lens section 11 is driven, the movable section moves along the optical axis while holding the optical section 1. Meanwhile, the fixed section does not change in position. The movable section is contained in the fixed section and includes the lens holder 21 and a coil 22. Meanwhile, the fixed section includes a yoke 23, a permanent magnet 24, a cover 25 and a base 26.

The lens holder 21 is a circular tubular member and has the screw section formed on the inner peripheral surface of the lens holder 21. The lens holder 21 holds the lens barrel 12 by use of this screw section. Further, the lens holder 21 is provided with a flange at a lower end section of an outer peripheral surface of the lens holder 21. The coil 22 provided in parallel to the outer peripheral surface of the lens holder 21 is fixed to an outer edge section of the flange of the lens holder 21. Furthermore, respective ends of the lens holder 21 in a direction in which the optical axis extends are provided with springs 27a and 27b. The spring 27a has one end fixed to an upper end of the lens holder 21 and the other end to the yoke 23. Meanwhile, the spring 27b has one end fixed to a lower end of the lens holder 21 which lower end is opposed to the upper end of the lens holder 21, and the other end fixed to the base 26. Because the springs 27a and 27b are elastic, the springs 27a and 27b supplementarily support to the lens holder 21 so that the lens holder 21 is movable along the optical axis. Note that respective positions at which the springs 27a and 29b are fixed are not specifically limited, as long as one end is fixed to the movable section and the other end is fixed to the fixed section.

The yoke 23 includes a rectangular tubular section 23a that is made of a rectangular tubular member constituting side surfaces of the lens driving section 2, a circular tubular section 23c that is made of a circular tubular member provided inside the rectangular tubular section 23a, and a joint section 23b that joins the rectangular tubular section 23a and the circular tubular section 23c.

The rectangular tubular section 23a and the circular tubular section 23c are joined to each other at upper ends by the joint section 23b. The rectangular tubular section 23a has a lower end fixed to an outer edge section of the base 26. The yoke 23 is positioned so that the coil 22 is provided between the rectangular tubular section 23a and the circular tubular section 23c. On an inner surface of the rectangular tubular section 23a, the permanent magnet 24 is disposed so that a predetermined space exists between the permanent magnet 24 and the coil 22.

Further, in the present embodiment, the cover 25 is provided above the joint section 23b. The cover 25 forms an upper surface (top surface) of the lens driving section 2. This cover 25 has an opening 25a at a center section. This opening 25a is for allowing light from the object to enter the camera module 100. The opening 25a is provided with a windshield that is provided for preventing a foreign substance from entering the camera module 100.

Note that in the present embodiment, the side surfaces of the lens driving section 2 are formed by the yoke 23 and the upper surface of the lens driving section 2 is formed by the cover 25. Alternatively, for example, both the side surfaces and the upper surface of the lens driving section 2 may be formed by the yoke 23 and the cover 25 can be omitted. In this case, because the yoke also serves as the cover 25, the opening 25a is formed on the yoke 23.

The base 26 constitutes a base for the lens driving section 2. The base 26, at a center section, an opening 26a that is for ensuring an optical path.

In this way, in the lens driving section 2, the lens holder 21 holding the lens barrel 12 on the inner surface of the lens holder 23 is provided in a space that is formed by the yoke 23, the cover 25, and the base 26. The coil 22, the yoke 23, and the permanent magnet 24 form a magnetic circuit. When current is supplied to the coil 22, an electromagnetic phenomenon occurs between the coil 22 and the permanent magnet 24. Due to this electromagnetic phenomenon, thrust in a direction in which the optical axis extends is given to the lens holder 21 that is fixed to the coil 22 in a manner that the lens holder 21 is integrated with the coil 22. This thrust makes it possible to move the lens holder 21 along the optical axis. When the lens holder 21 moves along the optical axis, the springs 27a and 27b that are being deformed support the lens holder 21.

Note that as illustrated in FIG. 2, the lens holder has a protrusion 21a at a lower end. When this protrusion 21a is abutting the base 26, the lens holder is pressed downward due to elastic force of the springs 27a and 27b.

Further, in the present embodiment, a groove 26b is formed on an upper surface (a surface facing a bottom surface of the lens holder 21) of the base 26 in an area in the vicinity of right below the coil 22 and the permanent magnet 24. Inside this groove 26b, a sticky dust trapping agent 28 is applied.

The dust trapping agent 28 may be applied onto the upper surface of the base 26. However, by applying the dust trapping agent 28 inside the groove 26b as in the present embodiment, it is possible to keep a foreign substance staying in the groove 26b. In other words, it is possible to trap and keep, within the groove 26b, a foreign substance that has just fallen onto the base 26 through a space between the coil 22 and the permanent magnet 24. This makes it possible to reliably trap, by use of the dust trapping agent 28, a foreign substance that has fallen onto the base 26. Therefore, it becomes possible to effectively prevent such a substance from discharged from the opening 26a.

Note that the dust trapping agent 28 is not specifically limited as long as the dust trapping agent 28 is sticky. For example, the dust trapping agent 28 can be made of fat or resin in a semisolid state (or in a state close to solid). It is particularly preferable that the dust trapping agent 28 is made of grease. The grease is one kind of fat in a semisolid state or in a state close to liquid, and can be made from, for example, a semisolid lubricant (or a lubricant in a state close to solid) or a paste lubricant.

Examples of the grease that can be used in the present embodiment are a molybdenum disulfide lubricant, a white lubricant, a silicone lubricant, or a perfluoropolyether lubricant. Alternative examples of the grease are mineral oil grease containing mineral oil as a main component, poly-α-olefin grease containing poly-α-olefin oil as a main component, silicone grease containing silicone oil as a main component, fluorosilicone grease, perfluoropolyether grease containing perfluoropolyether as a main component.

The above kinds of grease can be used singly or in combination of two or more kinds. Further, the grease may contain an additive for grease, such as lithium soap, calcium soap, or polytetrafluoroethylene (PTFE).

The OIS section 3 is provided to a bottom surface (a bottom surface of the base 26) of the lens driving section 2. This OIS section 3 is an optical image stabilizer of a sensor-shift system that carries out image stabilization by shifting the image sensor section 5 in accordance with camera shake. Note that the OIS section 3 is explained later in detail.

The image pickup section 4 converts, into an electrical signal, light that has been collected by the optical section 1. The image pickup section 4 includes the image sensor section 5 and the substrate 6 to which the image sensor section 5 is mounted.

The image sensor section 5 includes a glass substrate 51, the sensor chip 52 and a sensor cover 53.

The glass substrate 51 is made of a light-transmitting member and disposed so as to cover the light-receiving section of the sensor chip 52. In the present embodiment, on a surface of the glass substrate 51, an infrared blocking film (IR cut film) is formed. Accordingly, the glass substrate 51 has a function of blocking infrared rays.

The sensor chip 52 is mounted to the substrate 6. This sensor chip 52 is an image pickup element that converts, into an electrical signal, light that has been collected by the optical section 1. In other words, the sensor chip 52 is a sensor device that converts, into an electrical signal, an optical signal that has been received via the lens section 11. The sensor chip 52 can be made of, for example, a CCD or a CMOS sensor IC. Further, the sensor chip 52 has the light-receiving section (not illustrated) on a surface (image pickup plane) of the sensor chip 52. This light-receiving section is provided with a plurality of pixels that are arranged in a matrix form. The light-receiving section is an area in which an image is formed from the light that has been collected by the optical section 1, and can also be called a pixel area.

The sensor chip 52 converts, into an electrical signal, an object image formed in this light-receiving section (pixel area), and then outputs the electrical signal as an analog image signal. An operation of the sensor chip 52 is controlled by a DSP (not illustrated). The analog image signal that has been generated by the sensor chip 52 is outputted to the DSP, and then processed.

The sensor cover 53 is provided so as to cover part of the sensor chip 52 and a surface of the substrate 6. The sensor cover 53 has an opening 53*a* that is formed in a position corresponding to the light-receiving section of the sensor chip 52. This opening 53*a* is provided for ensuring an optical path. Further, the opening 53*a* has an inner peripheral surface that has different surface levels. The different surface levels allow the glass substrate 51 to be supported between the OIS section 3 and the sensor chip 52 so that there exists a predetermined space between the glass substrate 51 and each of the OIS section 3 and the sensor chip 52. The opening 53*a* is a light-transmitting area through which light having entered through the lens section 11 reaches the light-receiving section of the sensor chip 52.

Note that in the present embodiment, the glass substrate 51 is fixed in the opening 53*a* of the sensor cover 53. However, the glass substrate 51 may alternatively be bonded and fixed to the sensor chip 52 by use of an adhesive or the like. However, it is preferable to have a configuration of the present embodiment in which the glass substrate 51 is disposed so that a predetermined distance is provided between the glass substrate 51 and the sensor chip 52. This is because such a configuration makes it possible to reduce influence of a foreign substance that adheres to the glass substrate, for example, casting of a foreign substance onto the sensor chip 52.

The substrate 6 includes a patterned wiring (not illustrated). The image sensor section 5 (sensor chip 52) is electrically connected with the substrate 6 by this wiring. The substrate 6 may be made of, for example, a printed substrate or a ceramic substrate.

As described above, in the image pickup section 4, an optical signal having entered the sensor chip 52 is converted into an electrical signal. The electrical signal obtained by this conversion is inputted as an image signal into a control circuit or the like of the camera module 100 via the substrate 6.

[2] IMAGE HEIGHT-OPTICAL DISTORTION CURVE OF LENS Section

Figure 3:
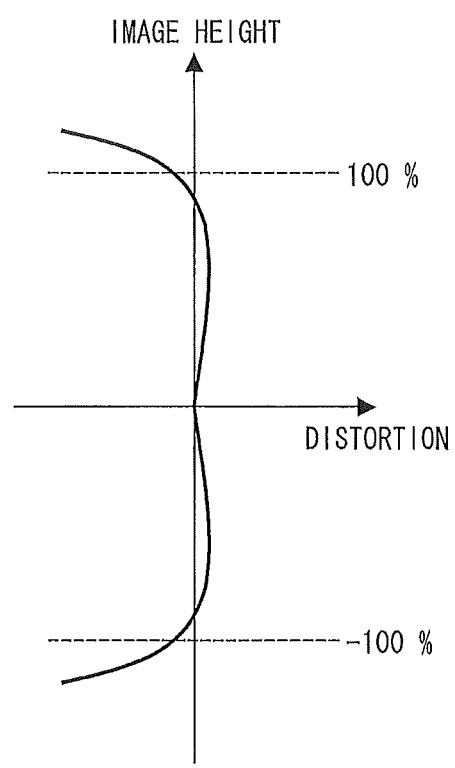
FIG. 3 is a graph an image height-optical distortion curve of a lens section as shown in FIG. 2.

Next, the following discusses an image height-optical distortion curve of the lens section 11 in the camera module 100, with reference to FIG. 3.

FIG. 3 is a graph showing an image height-optical distortion curve of the lens section 11 as illustrated in FIG. 2. In FIG. 3, a vertical axis represents an image height (%) indicating a distance of a captured image from a center position, and a horizontal axis represents an optical distortion (%).

As illustrated in FIG. 3, in the image height-optical distortion curve of the lens section 11, the optical distortion is a maximum value that is a positive peak value in each of intermediate image height (±50%) regions, and then, as the image height approaches each of maximum image heights (±100%), gradually decreases in value from the maximum value. In other words, the lens section 11 has an optical distortion characteristic in which the optical distortion gradually decreases at the maximum image heights (±100%) and in the vicinity of the maximum image heights.

Because the lens section 11 has such an optical distortion characteristic, a polarity of an amount of change in optical distortion produced by an inclination of the camera module 100 with respect to an object can be arranged in image stabilization to be opposite to a polarity of an amount of change in optical distortion produced by shifting the image sensor section 5 with use of the OIS section 3 (see FIG. 8). Note that regions in the vicinity of the maximum image heights are determined as appropriate in accordance with the inclination of the camera module 100 with respect to the object and an amount of shift of the image sensor section 5 with use of the OIS section 3.

Further, an amount of decrease in optical distortion at each of the maximum image heights (±100%) and in the vicinity of the maximum image height is set in a range of 0.1% or more and 0.5% or less per 10% of the image height so that the amount of change in optical distortion produced by the inclination of the camera module 100 with respect to the object is substantially equal to the amount of change in optical distortion produced by shifting the image sensor section 5 with use of the OIS section 3. This makes it possible to effectively suppress distortion in a captured image in image stabilization, as described later.

Note that in the image height-optical distortion curve, preferably, (i) a positive peak value of the optical distortion is positioned in a region having the image height in a range of 30% or higher and 60% or lower in absolute value of each of the maximum image heights (±100%) and (ii) the positive peak value is in a range of 0.5% or more and 2.0% or less. Further, the optical distortion at each of the maximum image heights (±100%) is preferably in a range of −1.0% or more and +0.1% or less and a TV distortion at each of the maximum image heights (±100%) is preferably in a range of −2.0% or more and −0.5% or less.

This makes it possible to obtain a preferable image height-optical distortion curve that allows (a) an amount of change in optical distortion produced by an inclination of the camera module 100 with respect to an object and (b) an amount of change in optical distortion produced by shifting the image sensor section 5 with use of the OIS section 3 to be substantially equal in magnitude but opposite in polarity.

[3] CONFIGURATION OF OIS SECTION

Figure 4:
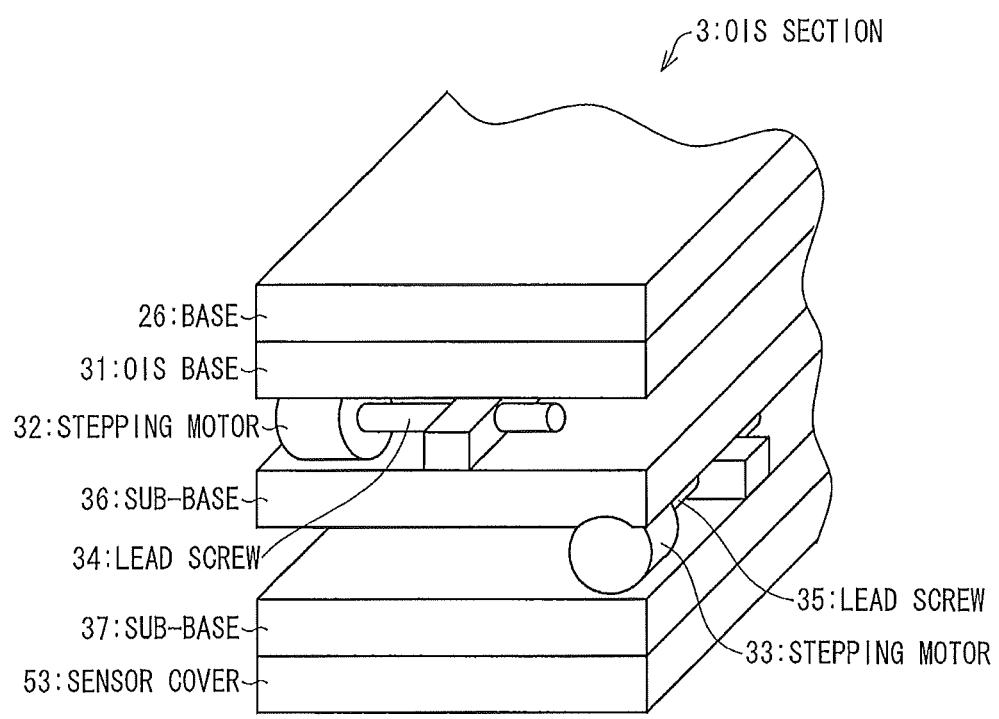
FIG. 4 is a perspective view schematically illustrating a configuration of an OIS section as shown in FIG. 2.

Next, the following discusses in detail a configuration of the OIS section 3 with reference to FIG. 4. FIG. 4 is a perspective view schematically illustrating a configuration of the OIS section 3 illustrated in FIG. 2. As illustrated in FIG. 4, the OIS section 3 includes an OIS base 31, stepping motors 32 and 33, lead screws 34 and 35, and sub-bases 36 and 37.

The stepping motor 32 and the lead screw 34 are drive means for driving the sub-base 36 along an X axis (see FIG. 7). The stepping motor 32 is fixed to the OIS base 31 and drives, along the X axis, the sub-base 36 that is fixed to a movable section of the lead screw 34.

Further, the stepping motor 33 and the lead screw 35 are drive means for driving the sub-base 37 along a Y axis (see FIG. 7). The stepping motor 32 is fixed to the sub-base 36 and drives, along the Y axis, the sub-base 37 that is fixed to a movable section of the lead screw 35.

The OIS section 3 configured as described above has the stepping motors 32 and 33 as drive sources, and drive operations of the stepping motors 32 and 33 are controlled. This makes it possible to shift the image sensor section 5 in directions parallel to the X and Y axes.

Note that the drive operation of each of the stepping motors 32 and 33 is controlled in accordance with an output signal from a gyro sensor (not illustrated) that detects an inclination of the camera module 100 in terms of acceleration, angular acceleration, an angular velocity or the like. It is thereby possible to correct misalignment of the optical axis with respect to the light-receiving section of the sensor chip 52 by shifting the image sensor section 5 in accordance with camera shake.

[4] OPERATION IN IMAGE STABILIZATION

Next, the following discusses an operation in image stabilization that is carried out by the camera module 100, with reference to FIGS. 5 through 8.

(a) of FIG. 5 is a side view illustrating a state in which the camera module 100 is directly confronting an object O; and (b) of FIG. 5 is a schematic view illustrating a captured image taken by the camera module 100 as illustrated in (a) of FIG. 5.

In (a) of FIG. 5, the reference sign O indicates an rectangular plate object, the reference sign Oc indicates a center of the object O, the reference sign 100 indicates the camera module, the reference sign 1 indicates an optical section, the reference sign 1c indicates a center of the optical section 1, the reference sign 5 indicates an image sensor section, the reference sign 5c indicates a center of the image sensor section 5, the reference sing S indicates an optical axis of the camera module 100 which optical axis passes through the center 5c of the image sensor section 5 and the center 1c of the optical section 1. Meanwhile, in (b) of FIG. 5, the reference sign Ic indicates a center of a captured image (frame), the reference sign OI indicates an object image, and the reference sign OIc indicates a center OIc of the object image OI.

When the center Oc of the object O is on the optical axis s that passes through the center 5c of the image sensor section 5 and the center 1c of the optical section 1 (see (a) of FIG. 5), the center Ic of the captured image coincides with the center OIc of the object image OI (see (b) of FIG. 5). As a result, it is possible to obtain a captured image in which the object image OI is accurately taken in a rectangular shape.

(a) of FIG. 6 is a side view illustrating a state in which the camera module 100 is inclined with respect to the object O. (b) of FIG. 6 is a schematic view illustrating a captured image taken by the camera module 100 as illustrated in (a) of FIG. 6. (a) of FIG. 6 illustrates a state in which the camera module 100 is inclined downward relative to a horizontal direction with respect to the object P, due to a push of a shutter button or the like.

As illustrated in (a) of FIG. 6, in a state where the optical axis s is shifted downward with respect to the center Oc of the object O, the center OIc of the object image OI is also shifted from the center Ic of the captured image (see (b) of FIG. 6). In case of capturing a static image, thus captured image blurs when the center OIc of the object image OI does not coincide with the center Ic of the captured image at the time when a shutter is released. Further, in case of capturing a moving image, the moving image is captured in a state where the moving image is fluctuating up and down. This is a phenomenon called camera shake.

(a) of FIG. 7 is a side view illustrating an operation in image stabilization that is carried out by the camera module 100; (b) of FIG. 7 is a schematic view illustrating a captured image taken by the camera module 100 as illustrated in (a) of FIG. 7.

In a case where camera shake occurs as illustrated in (a) of FIG. 7, the OIS section 3 shifts the image sensor section 5 in a negative X direction so that the center Oc of the object O is on the optical axis s. This makes it possible to coincide the center OIc of the object image OI with the center Ic of the captured image, and consequently to correct the camera shake.

At this time, the lens section 11 of the camera module 100 has the image height-optical distortion curve as illustrated in FIG. 3. That is, the lens section 11 has an optical distortion characteristics in which the optical distortion gradually decreases at the maximum image heights (±100%) and in the vicinity of the maximum image heights.

Accordingly, as illustrated in (b) of FIG. 7, distortion of the object image OI is suppressed in a captured image taken under image stabilization by the camera module 100 as compared to distortion in a captured image taken under image stabilization by a conventional camera module 200 as illustrated in (b) of FIG. 9. This is because the camera-movement amount in the image stabilization is reduced in the camera module 100 as compared to that in the conventional camera module 200.

FIG. 8 is a graph showing an image height-optical distortion of the lens section 11 in the image stabilization as illustrated in (a) of FIG. 7.

As illustrated in FIG. 8, in the image height-optical distortion curve in the image stabilization, an amount of change in optical distortion produced by shifting the image sensor section 5 with use of the OIS section 3 is added to an amount of change in optical distortion produced by an inclination of the camera module 100 with respect to the object O.

In the present embodiment, because the lens section 11 has an image height-optical distortion characteristic as shown in FIG. 3, (a) the amount of change in optical distortion produced by an inclination of the camera module 100 with respect to the object O and (b) the amount of change in optical distortion produced by shifting the image sensor section 5 with use of the OIS section 3 are substantially equal in magnitude but opposite in polarity. As a result, the amounts of change in optical distortion cancel each other in image stabilization. This makes it possible to reduce the camera-movement amount as illustrated in FIG. 8 and consequently to suppress distortion in a captured image in image stabilization.

[5] SUMMARY

As described above, the camera module 100 of the present embodiment includes: the optical section 1 including a lens section 11 made of at least one optical lens 11a, 11b, or 11c; an image sensor section 5 including a sensor chip 52 converting, into an electrical signal, light that enters the sensor chip 52 through the lens section 11; and an OIS section 3 correcting misalignment of an optical axis with respect to the sensor chip 52, by shifting relative positions of the optical section 1 and the image sensor section 5 in parallel to an image pickup plane of the sensor chip 52 in accordance with an inclination of a main body of the camera module 100, the lens section 11 having an image height-optical distortion curve in which an optical distortion is a positive maximum value in each of intermediate image height regions and the optical distortion gradually decreases from the maximum value as an image height approaches each of the maximum image heights (±100%).

In the above configuration, in the image height-optical distortion curve of the lens section 11, the optical distortion is a positive maximum value in each of intermediate image height regions and the optical distortion gradually decreases from the maximum value as an image height approaches each of the maximum image heights. Therefore, (a) an amount of change in optical distortion produced by an inclination of the camera module 100 with respect to an object O and (b) an amount of change in optical distortion produced by shifting the sensor chip 52 with use of the OIS section 3 become substantially equal in magnitude but opposite in polarity.

Therefore, (a) the amount of change in optical distortion produced by the inclination of the camera module 100 with respect to an object O and (b) the amount of change in optical distortion produced by shifting the sensor chip 52 with use of the OIS section 3 cancel each other in image stabilization. This makes it possible to reduce a camera-movement amount in the image stabilization, and consequently to suppress distortion in a captured image.

As described above, in the camera module 100 of the present embodiment, it is possible to suppress distortion in a captured image in image stabilization by optimizing an image height-optical distortion curve of the lens section in a configuration which does not include a special ISP (Image Signal Processor) that is conventionally provided.

Therefore, the present embodiment is capable of providing, at low cost, a compact camera module 100 that is capable of suppressing distortion in a captured image in image stabilization.

Note that though the present embodiment discussed above a configuration in which an optical image stabilizer of a sensor-shift system is provided as the OIS section 3, the present invention is not limited to such a configuration. For example, it is possible to provide, in the configuration, an optical image stabilizer of a lens-shift system in place of the optical image stabilizer of the sensor-shift system.

Further, the present embodiment discussed one example of an image height-optical distortion curve of the lens section 11, by specifically showing such an example in FIG. 3. However, the image height-optical distortion curve is not specifically limited as long as a polarity of an amount of change in optical distortion produced by an inclination of the camera module 100 with respect to an object O is opposite to a polarity of an amount of change in optical distortion produced by shifting the sensor chip 52 with use of the OIS section 3.

[6] CONCLUSION OF EMBODIMENT

As described above, a camera module of the present embodiment includes: optical means including a lens section made of at least one optical lens; sensor means including an image pickup element converting, into an electrical signal, light that enters the image pickup element through the lens section; and image stabilization means correcting misalignment of an optical axis with respect to the image pickup element, by shifting relative positions of the optical means and the sensor means in parallel to an image pickup plane of the image pickup element in accordance with an inclination of a main body of the camera module, the lens section having an image height-optical distortion curve in which an optical distortion is a positive maximum value in an intermediate image height region and the optical distortion gradually decreases from the maximum value as an image height approaches a maximum image height.

In general, in an image height-optical distortion curve of a lens section in image stabilization, an amount of change in optical distortion produced by shifting relative positions of the optical means and the sensor means with use of the image stabilization means is added to an amount of change in optical distortion produced by an inclination of a camera module with respect to the object. In case of a conventional camera module, this increases a camera-movement amount in image stabilization and consequently significantly alters perspective (scale factor) in a peripheral section of an object image. This conventionally caused a problem of distortion, for example.

In the above configuration, the lens section has an image height-optical distortion curve in which an optical distortion is a positive maximum value in an intermediate image height region and the optical distortion gradually decreases from the maximum value as an image height approaches the maximum image height. As a result, in image stabilization, a polarity of an amount of change in optical distortion produced by an inclination of the camera module with respect to the object is opposite to a polarity of an amount of change in optical distortion produced by shifting relative positions of the optical means and the sensor means with use of the image stabilization means. Therefore, these amounts of change in optical distortion cancel each other.

This makes it possible to reduce the camera-movement amount in image stabilization, as compared to that in case of a conventional camera module, and consequently suppress distortion in a captured image. Note that the above reduction in image distortion encompasses not only a continuous reduction but also a stepwise reduction.

As described above, in the above configuration, distortion in a captured image can be suppressed in image stabilization by optimizing the image height-optical distortion curve of the lens section. This makes it possible to provide, at low cost, a compact camera module which is capable of suppressing distortion in a captured image in image stabilization.

In the camera module of the present embodiment, preferably, an amount of decrease in the optical distortion at the maximum image height and in the vicinity of the maximum image height is determined so that an amount of change in optical distortion produced by the inclination of the main body of the camera module is substantially equal to an amount of change in optical distortion produced by a shift of relative positions of the optical means and the sensor means, the shift being performed by the image stabilization means.

In the above configuration, (a) an amount of change in optical distortion produced by an inclination of the camera module with respect to the object and (b) an amount of change in optical distortion produced by shifting relative positions of the optical means and the sensor means with use of the image stabilization means are substantially equal in magnitude but opposite in polarity. Therefore, these amounts of change in optical distortion cancel each other. Note that a region in the vicinity of the maximum image height is determined as appropriate in accordance with the inclination of the camera module with respect to the object and an amount of a shift of relative positions of the optical means and the sensor means, which shift is carried out by the image stabilization means.

This makes it possible to further reduce the camera-movement amount in image stabilization, and as a result, effectively suppress distortion in a captured image.

Further in the camera module of the present embodiment, preferably, the amount of decrease is in a range of 0.1% or more and 0.5% or less per 10% of the image height.

Further, in the camera module of the present embodiment, preferably, the intermediate image height region is a region in which the image height is in a range of 30% or higher and 60% or lower with respect to the maximum image height.

The above configuration makes it possible to obtain a preferable image height-optical distortion curve that allows (a) an amount of change in optical distortion produced by an inclination of the camera module with respect to an object and (b) an amount of change in optical distortion produced by shifting relative positions of the optical means and the sensor means with use of the image stabilization means to be substantially equal in magnitude but opposite in polarity.

Further, in the camera module of the present embodiment, preferably, the image stabilization means is an optical image stabilizer of a lens-shift system, the optical image stabilizer of the lens-shift system correcting the misalignment of the optical axis with respect to the image pickup element by shifting the optical means.

Further, in the camera module of the present embodiment, preferably, the image stabilization means is an optical image stabilizer of a sensor-shift system, the optical image stabilizer of the sensor-shift system correcting misalignment of the optical axis with respect to the image pickup element by shifting the sensor means.

In the above configuration, the image stabilization means is configured by using an optical image stabilizer of a lens-shift system or a sensor-shift system.

This configuration makes it possible to suppress distortion in a captured image in image stabilization that is carried out by an optical image stabilizer of a lens-shift system or a sensor-shift system.

In order to solve the above problem, an imaging device of the present embodiment includes the camera module.

This makes it possible to provide, at low cost, a compact imaging device that is capable of suppressing distortion in a captured image in image stabilization.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be suitably applied particularly to a camera module mounted to various electronics devices including communication devices such as mobile terminals. Examples of such electronics devices are digital cameras, digital still cameras, mobile phones, mobile information terminals, and personal computers.

REFERENCE SIGNS LIST 1 optical section (optical means)
2 lens driving section
3 OIS section (image stabilization means)
4 image pickup section
5 image sensor section (sensor means)
6 substrate
11 lens section
11a optical lens
11b optical lens
11c optical lens
12 lens barrel
52 sensor chip (image pickup element)
100 camera module
s optical axis
O object
Oc center of object
Ic center of captured image
OI object image
OIc center of object image

The invention claimed is:

1. A camera module comprising:
optical means including a lens section made of at least one optical lens;
sensor means including an image pickup element converting, into an electrical signal, light that enters the image pickup element through the lens section; and
image stabilization means correcting misalignment of an optical axis with respect to the image pickup element, by shifting relative positions of the optical means and the sensor means in parallel to an image pickup plane of the image pickup element in accordance with an inclination of a main body of the camera module,
the lens section having an image height-optical distortion curve in which an optical distortion is a positive maximum value in an intermediate image height region and the optical distortion gradually decreases from the maximum value as an image height approaches a maximum image height,
the optical distortion having an amount of decrease at the maximum image height and in the vicinity of the maximum image height, which amount is determined so that (a) an amount of change in optical distortion produced by the inclination of the main body of the camera module and (b) an amount of change in optical distortion produced by a shift of the relative positions of the optical means and the sensor means are substantially equal to each other and cancel each other, the shift being performed by the image stabilization means.

2. The camera module as set forth in claim 1, wherein:
the amount of decrease is in a range of 0.1% or more and 0.5% or less per 10% of the image height.

3. The camera module as set forth in claim 1, wherein:
the intermediate image height region is a region in which the image height is in a range of 30% or higher and 60% or lower with respect to the maximum image height.

4. The camera module as set forth in any one of claim 1 wherein:
the image stabilization means is an optical image stabilizer of a lens-shift system, the optical image stabilizer of the lens-shift system correcting the misalignment of the optical axis with respect to the image pickup element by shifting the optical means.

5. The camera module as set forth in any one of claim 1, wherein:
the image stabilization means is an optical image stabilizer of a sensor-shift system, the optical image stabilizer of the sensor-shift system correcting misalignment of the optical axis with respect to the image pickup element by shifting the sensor means.

6. The imaging device comprising a camera module as set forth in any one of claim 1.

* * * * *